United States Patent
Wang et al.

(10) Patent No.: US 11,178,623 B2
(45) Date of Patent: Nov. 16, 2021

(54) PSEUDO-DYNAMIC POWER SHARING FOR INCREASED USER EQUIPMENT COVERAGE AND GRACEFUL HANDLING OF MISCONFIGURATION IN MULTI-RADIO ACCESS TECHNOLOGY DUAL CONNECTIVITY (MR-DC)

(71) Applicant: QUALCOMM Incorporated, San Diego, CA (US)

(72) Inventors: Shanshan Wang, San Diego, CA (US); Reza Shahidi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 12 days.

(21) Appl. No.: 16/670,616

(22) Filed: Oct. 31, 2019

(65) Prior Publication Data
US 2021/0136702 A1    May 6, 2021

(51) Int. Cl.
*H04W 52/32* (2009.01)
*H04W 72/10* (2009.01)
(Continued)

(52) U.S. Cl.
CPC ....... *H04W 52/365* (2013.01); *H04W 52/146* (2013.01); *H04W 72/0473* (2013.01); *H04W 72/10* (2013.01); *H04W 88/06* (2013.01)

(58) Field of Classification Search
None
See application file for complete search history.

(56) References Cited

U.S. PATENT DOCUMENTS 10,764,832 B2*  9/2020  Comsa ................ H04W 52/265
2014/0302804 A1* 10/2014  Hu .................... H04W 72/0473
                                              455/101
(Continued)

FOREIGN PATENT DOCUMENTS

EP        2410661 A1     1/2012
WO     2015005633 A1     1/2015

OTHER PUBLICATIONS

Ericsson: "Increasing EN-DC Power for FDD-TDD PC2 and PC3", 3GPP Draft, R4-1908721, 3rd Generation Partnership Project (3GPP), Mobile Competence Centre, 650, Route Des Lucioles, F-06921 Sophia-Antipolis Cedex, France, vol. RAN, No. Ljubljana, Slovenia, Aug. 26, 2019-Aug. 30, 2019, Aug. 16, 2019 (Aug. 16, 2019), XP051771668, 7 Pages. Retrieved from the Internet: URL: http://www.3gpp.org/ftp/tsg_ran/WG4_Radio/TSGR4_92/Docs/R4-1908721.zip. [retrieved on Aug. 16, 2019] paragraph [6.2B.1.3] table 1.

(Continued)

*Primary Examiner* — Hong S Cho
(74) *Attorney, Agent, or Firm* — Muncy, Geissler, Olds & Lowe, P.C.

(57) ABSTRACT

In an aspect, a user equipment (UE) receives a parameter representing a maximum transmission power, transmits first radio frequency (RF) signals to a first node over a first wireless communication link in accordance with a first radio access technology (RAT) during a plurality of time segments, wherein the first RF signals are transmitted during the plurality of time segments at one or more first power levels, and transmits second RF signals to a second node over a second wireless communication link in accordance with a second RAT during the plurality of time segments, wherein the second RF signals are transmitted during the plurality of time segments at one or more second power levels, and wherein a sum of an average of both the one or more first (Continued)

power levels and the one or more second power levels over the plurality of time segments does not exceed the maximum transmission power.

30 Claims, 6 Drawing Sheets

(51) Int. Cl.
*H04W 72/04* (2009.01)
*H04W 52/14* (2009.01)
*H04W 88/06* (2009.01)
*H04W 52/36* (2009.01)

(56) References Cited

U.S. PATENT DOCUMENTS

2018/0014255 A1\* 1/2018 Pelletier .............. H04W 52/343
2019/0166565 A1   5/2019 Gaal et al.
2019/0253976 A1   8/2019 Pelletier et al.

OTHER PUBLICATIONS

International Search Report and Written Opinion—PCT/US2020/054756—ISA/EPO—dated Jan. 21, 2021.

\* cited by examiner

PSEUDO-DYNAMIC POWER SHARING FOR INCREASED USER EQUIPMENT COVERAGE AND GRACEFUL HANDLING OF MISCONFIGURATION IN MULTI-RADIO ACCESS TECHNOLOGY DUAL CONNECTIVITY (MR-DC)

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving a maximum total transmission power level permitted for uplink transmissions; transmitting first radio frequency (RF) signals to a first node over a first wireless communication link in accordance with a first radio access technology (RAT) during a plurality of time segments, wherein the first RF signals are transmitted during the plurality of time segments at one or more first power levels; and transmitting second RF signals to a second node over a second wireless communication link in accordance with a second RAT during the plurality of time segments, wherein the second RF signals are transmitted during the plurality of time segments at one or more second power levels, wherein a sum of an average of the one or more first power levels and an average of the one or more second power levels over the plurality of time segments does not exceed the maximum total transmission power level permitted for uplink transmissions.

In an aspect, an apparatus for wireless communication includes a memory of a UE; at least one processor of the UE coupled to the memory; and a communication device of the UE coupled to the at least one processor, the communication device configured to: receive a maximum total transmission power level permitted for uplink transmissions; transmit first RF signals to a first node over a first wireless communication link in accordance with a first RAT during a plurality of time segments, wherein the first RF signals are transmitted during the plurality of time segments at one or more first power levels; and transmit second RF signals to a second node over a second wireless communication link in accordance with a second RAT during the plurality of time segments, wherein the second RF signals are transmitted during the plurality of time segments at one or more second power levels, wherein a sum of an average of the one or more first power levels and an average of the one or more second power levels over the plurality of time segments does not exceed the maximum total transmission power level permitted for uplink transmissions.

In an aspect, an apparatus for wireless communication includes means of a UE for receiving a maximum total transmission power level permitted for uplink transmissions; means of the UE for transmitting first RF signals to a first node over a first wireless communication link in accordance with a first RAT during a plurality of time segments, wherein the first RF signals are transmitted during the plurality of time segments at one or more first power levels; and means of the UE for transmitting second RF signals to a second node over a second wireless communication link in accordance with a second RAT during the plurality of time segments, wherein the second RF signals are transmitted during the plurality of time segments at one or more second power levels, wherein a sum of an average of the one or more first power levels and an average of the one or more second power levels over the plurality of time segments does not exceed the maximum total transmission power level permitted for uplink transmissions.

In an aspect, a non-transitory computer-readable medium stores computer-executable instructions that, when executed by a UE, cause the UE to: receive a maximum total transmission power level permitted for uplink transmissions; transmit first RF signals to a first node over a first wireless communication link in accordance with a first RAT during a plurality of time segments, wherein the first RF signals are transmitted during the plurality of time segments at one or more first power levels; and transmit second RF signals to a second node over a second wireless communication link in accordance with a second RAT during the plurality of time segments, wherein the second RF signals are transmitted during the plurality of time segments at one or more second power levels, wherein a sum of an average of the one or more first power levels and an average of the one or more second power levels over the plurality of time segments does not exceed the maximum total transmission power level permitted for uplink transmissions.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
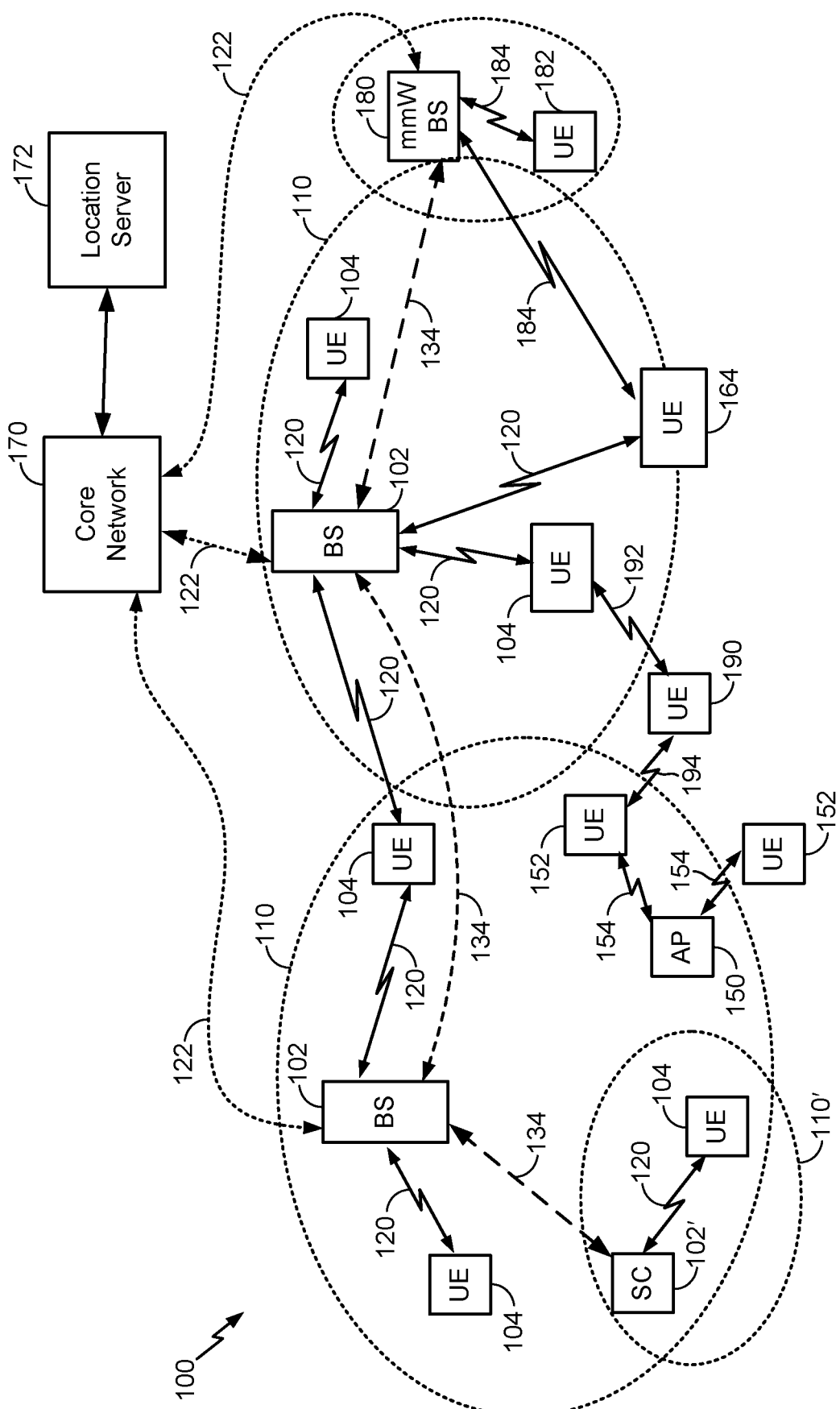
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station. Similarly, references to a TRP are to be understood as also referring to the base station supporting the TRP.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more application servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

More specifically, LBT is a mechanism by which a transmitter (e.g., a UE on the uplink or a base station on the downlink) applies CCA before using the channel/subband. Thus, before transmission, the transmitter performs a CCA check and listens on the channel/subband for the duration of the CCA observation time, which should not be less than some threshold (e.g., 15 microseconds). The channel may be considered occupied if the energy level in the channel exceeds some threshold (proportional to the transmit power of the transmitter). If the channel is occupied, the transmitter should delay further attempts to access the medium by some random factor (e.g., some number between 1 and 20) times the CCA observation time. If the channel is not occupied, the transmitter can begin transmitting. However, the maximum contiguous transmission time on the channel should be less than some threshold, such as 5 milliseconds.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In NR, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as NR, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/

182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies (utilized by the same or different RATs, such as LTE and NR), a UE 104 may be equipped with multiple receivers and/or transmitters. For example, a UE 104 may have two receivers, Receiver 1 and Receiver 2, where Receiver 1 is a multi-band receiver that can be tuned to band (i.e., carrier frequency) X or band Y, and Receiver 2 is a one-band receiver tuneable to band Z only. In this example, if the UE 104 is being served in band X, band X would be referred to as the PCell or the active carrier frequency, and Receiver 1 would need to tune from band X to band Y (an SCell) in order to measure band Y (and vice versa). In contrast, whether the UE 104 is being served in band X or band Y, because of the separate Receiver 2, the UE 104 can measure band Z without interrupting the service on band X or band Y. The simultaneous transmission and/or reception of multiple carriers enables a UE 104 to significantly increase its data transmission and/or reception rates.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In an aspect, at least the base station 102 to which the UE 164 is connected may operate in accordance with a first RAT (e.g., LTE), and mmW base station 180 may operate in accordance with a second RAT (e.g., NR). In the example of FIG. 1, UE 164 is connected to both base station 102 and mmW base station 180. As such, UE 164 is referred to as having "dual connectivity." To support this dual connectivity, the UE 164 may be equipped with multiple (e.g., at least two) receivers and transmitters (or transceivers), at least one capable of operating in accordance with the first RAT and at least one capable of operating in accordance with the second RAT. However, the UE 164 may also be equipped with a single transmitter/receiver/transceiver capable of operating in accordance with both RATs. Although only UE 164 is illustrated as having dual connectivity, this is for simplicity, and any of the other UE's illustrated in FIG. 1 may also be capable of dual connectivity.

Figure 2A:
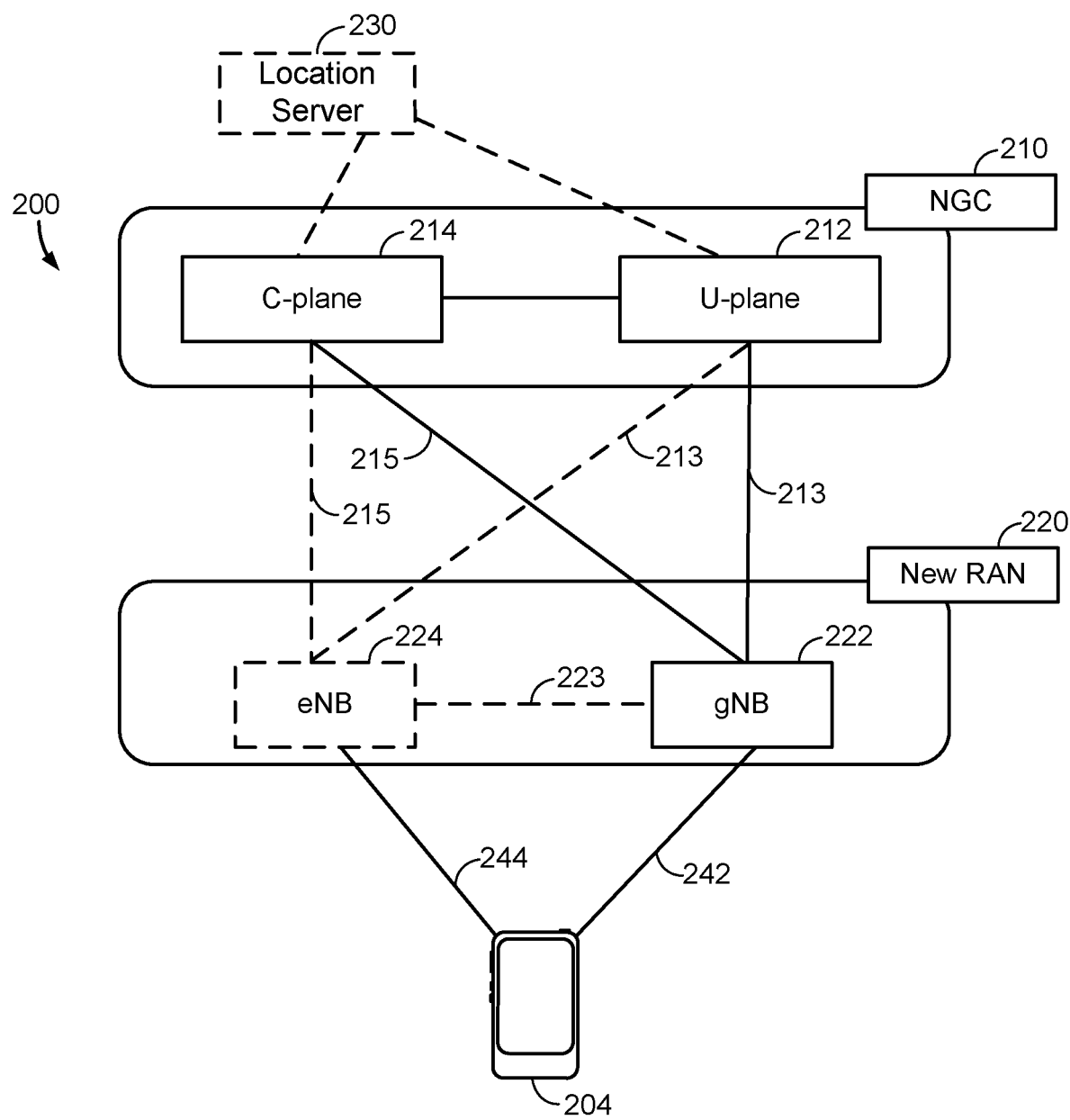
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect a gNB 222 (operating in accordance with NR) to the NGC 210 and specifically to the control plane functions 214 and user plane functions 212. In an additional configuration, an eNB 224 (operating in accordance with LTE) may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222.

Either gNB 222 or eNB 224 may communicate with one or more UEs 204 (e.g., any of the UEs described herein). In the example of FIG. 2A, the UE 204 is connected to the eNB 224 via a communication link 244 (e.g., a communication link 120 established in accordance with LTE), and to the gNB 222 via a communication link 242 (e.g., a mmW communication link 184 established in accordance with NR). In an aspect, the UE(s) 204 may support multi-RAT dual connectivity (MR-DC). Dual connectivity is used to achieve carrier aggregation using different RATs (e.g., LTE, NR), as opposed to using different cells operating in the same RAT. Dual connectivity is well-suited in heterogeneous networks (e.g., providing LTE and NR access). When configured for MR-DC, the UE(s) 204 may be connected to a primary or master node operating in accordance with a first RAT, referred to as a master RAT node, and to one or more secondary nodes operating in accordance with another RAT, referred to as secondary RAT nodes. In the example of FIG. 2A, the eNB 224 may be the master RAT node and the gNB 222 may be a secondary RAT node, or the gNB 222 may be the master RAT node and the eNB 224 may be a secondary RAT node. Examples of MR-DC include evolved universal terrestrial radio access (E-UTRA)-NR dual connectivity (EN-DC), New Radio dual connectivity (NR-DC), next generation RAN-E-UTRA dual connectivity (NGEN-DC), and NR-E-UTRA dual connectivity (NE-DC).

Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated).

Further, the location server 230 may be integrated into a component of the core network, or alternatively may be external to the core network.

Figure 2B:
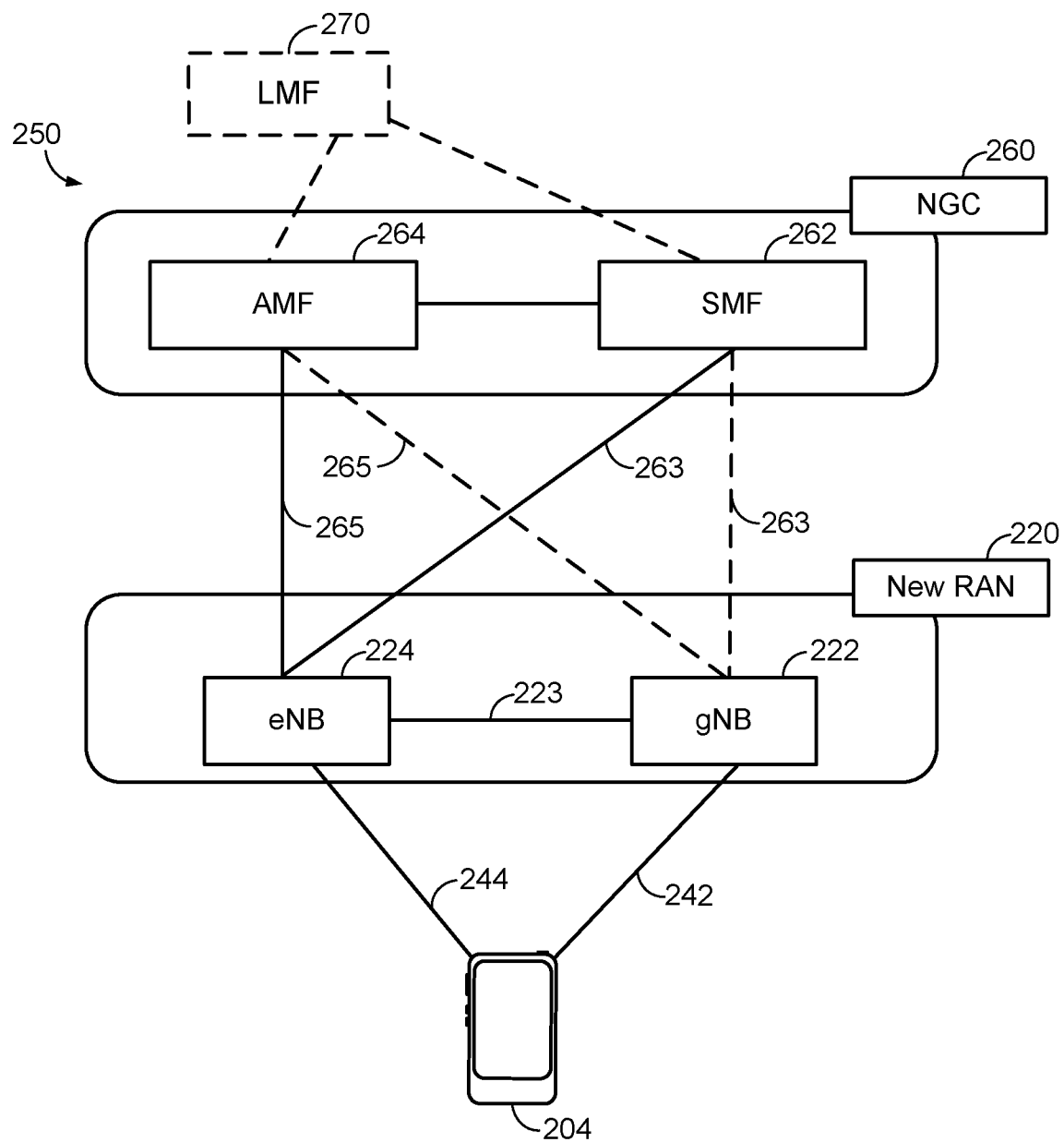

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
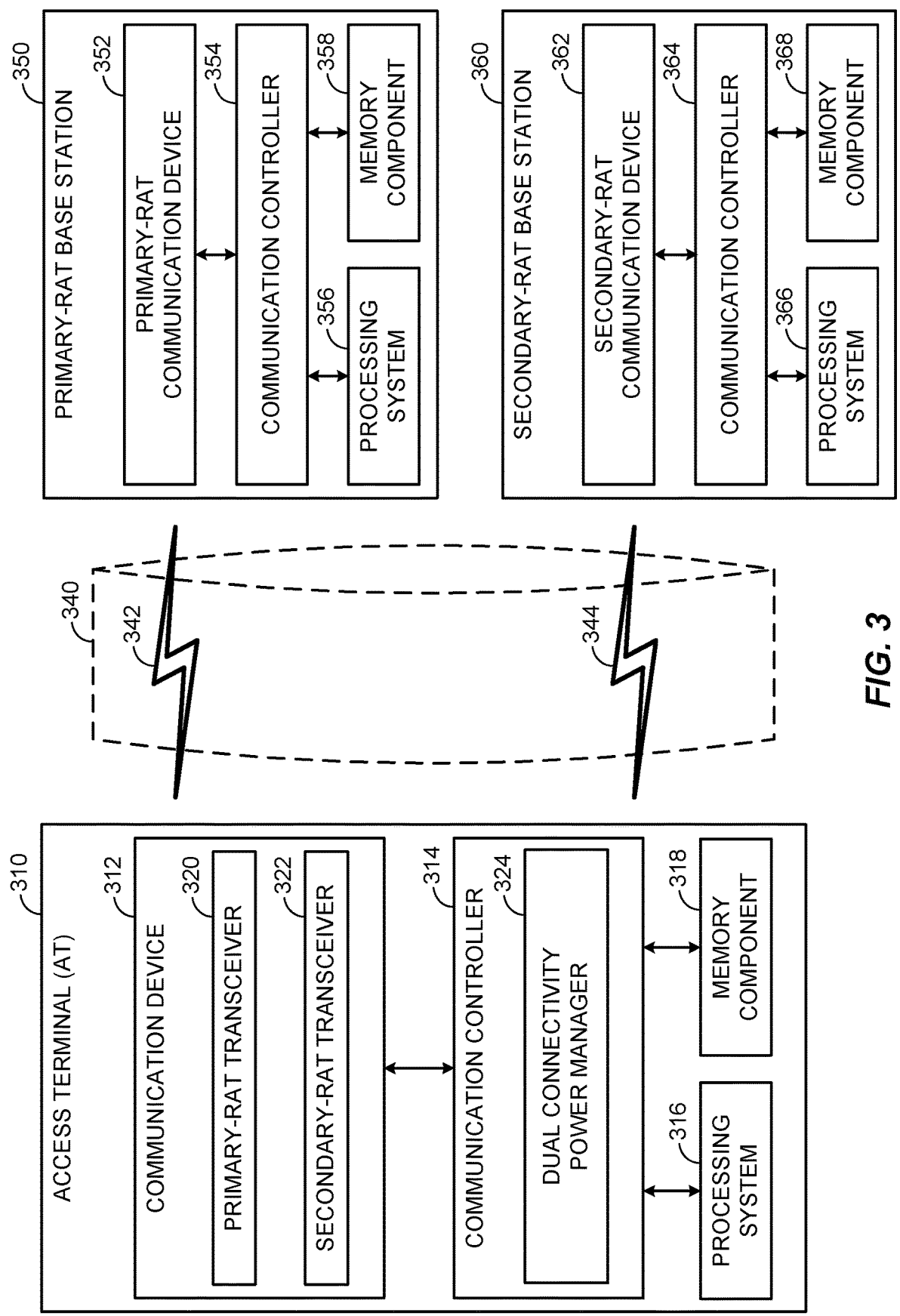
FIG. 3 is a block diagram illustrating an exemplary UE, according to various aspects.

FIG. 3 illustrates an example wireless communication system including a dual-connectivity UE 310 in communication with a primary RAT node 350 and a secondary RAT node 360. The UE 310 and nodes 350 and 360 may correspond to any of the UEs and base stations, respectively, described herein. For example, the UE 310 may correspond to one of UEs 204, the primary RAT base station 350 may correspond to eNB 224, and the secondary RAT base station 360 may correspond to gNB 222. The UE 310 and the nodes 350 and 360 each generally include a wireless communication device (represented by the communication devices 312, 352, and 362) for communicating with other network nodes via at least one designated RAT (e.g., LTE, NR). The communication devices 312, 352, and 362 may be variously configured for transmitting and encoding signals (e.g., messages, indications, information, and so on), and, conversely, for receiving and decoding signals (e.g., messages, indications, information, pilots, and so on) in accordance with the designated RAT. The UE 310 and the nodes 350 and 360 may also each generally include a communication controller (represented by the communication controllers 314, 354, and 364) for controlling operation of their respective communication devices 312, 352, and 362 (e.g., directing, modifying, enabling, disabling, etc.). The communication controllers 314, 354, and 364 may operate at the direction of or otherwise in conjunction with respective host system functionality (illustrated as the processing systems 316, 356, and 366 and the memory components 318, 358, and 368). In some designs, the communication controllers 314, 354, and 364 may be partly or wholly subsumed by the respective host system functionality.

Turning to the illustrated communication in more detail, the UE 310 may transmit and/or receive messages via a wireless link 342 with the primary RAT node 350. The UE 310 may also transmit and/or receive messages via a wireless link 344 with the secondary RAT node 360. The messages may include information related to various types of communication (e.g., voice, data, multimedia services, associated control signaling, etc.). In general, the primary RAT node 350 may operate via the wireless link 342 in accordance with a first (primary) RAT with associated primary RAT components. The secondary RAT node 360 may operate via the wireless link 344 in accordance with a second (secondary) RAT with associated secondary RAT components.

In an aspect, the wireless links 342 and 344 may operate over a common communication medium of interest, shown by way of example in FIG. 3 as the medium 340, which may be shared with still other communication systems and signaling schemes. A medium of this type may be composed of one or more frequency, time, and/or space communication resources (e.g., encompassing one or more channels across one or more carriers) associated with communication between one or more transmitter/receiver pairs.

As a particular example, the medium 340 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell base stations, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi."

However, as will be appreciated, the wireless links 342 and 344 may operate over different communication mediums. For example, where the primary RAT node 350 is an eNB (e.g., eNB 224) and the secondary RAT node 360 is a gNB (e.g., gNB 222), the wireless link 342 may operate over a medium of interest in FR1 and the wireless link 344 may operate over a medium of interest in FR2. Alternatively, where the primary RAT node 350 is a gNB (e.g., gNB 222) and the secondary RAT node 360 is an eNB (e.g., eNB 224), the wireless link 342 may operate over a medium of interest in FR2 and the wireless link 344 may operate over a medium of interest in FR1.

In the example of FIG. 3, the communication device 312 of the UE 310 includes a primary RAT transceiver 320 configured to operate in accordance with the primary RAT of the primary RAT node 350 and a co-located secondary RAT transceiver 322 configured to operate in accordance with the secondary RAT of the secondary RAT node 360. As an example, the primary RAT transceiver 320 may operate in accordance with LTE and the secondary RAT transceiver 322 may operate in accordance with NR. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

Referring to the processing systems 356 and 366 in more detail, in the downlink, IP packets from a network entity (e.g., an application server, location server, etc.) may be provided to the processing systems 356 and 366. The processing systems 356 and 366 may implement functionality for an RRC layer, a packet data convergence protocol (PDCP) layer, a radio link control (RLC) layer, and a medium access control (MAC) layer. The processing systems 356 and 366 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The primary RAT communication devices 352 and 362 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The primary RAT communication devices 352 and 362 handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 310. Each spatial stream may then be provided to one or more different antennas. The primary RAT communication devices 352 and 362 may modulate an RF carrier with a respective spatial stream for transmission.

At the UE 310, the communication device 312 receives a signal through its respective antenna(s). The communication device 312 recovers information modulated onto an RF carrier and provides the information to the processing system 316. The communication device 312 implements Layer-1 functionality associated with various signal processing functions. The communication device 312 may perform spatial processing on the information to recover any spatial streams destined for the UE 310. If multiple spatial streams are destined for the UE 310, they may be combined by the communication device 312 into a single OFDM symbol stream. The communication device 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the nodes 350 and 360. These soft decisions may be based on channel estimates computed by a channel estimator. The soft decisions are then decoded and de-interleaved to recover the data and control signals that were originally transmitted by the nodes 350 and 360 on the physical channel. The data and control signals are then provided to the processing system 316, which implements Layer-3 and Layer-2 functionality.

In the uplink, the processing system 316 provides demultiplexing between transport and logical channels, packet reassembly, deciphering, header decompression, and control signal processing to recover IP packets from the core network. The processing system 316 is also responsible for error detection.

Similar to the functionality described in connection with the downlink transmission by the nodes 350 and 360, the processing system 316 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the nodes 350 and 360 may be used by the communication device 312 to select the appropriate coding and modulation schemes, and to facilitate spatial processing. The spatial streams generated by the communication device 312 may be provided to different antenna(s). The communication device 312 may modulate an RF carrier with a respective spatial stream for transmission.

The UL transmission is processed at the nodes 350 and 360 in a manner similar to that described in connection with the receiver function at the UE 310. The communication devices 352 and 362 receive a signal through their respective antenna(s). The communication devices 352 and 362 recovers information modulated onto an RF carrier and provides the information to the processing systems 356 and 366.

In the uplink, the processing systems 356 and 366 provide demultiplexing between transport and logical channels, packet reassembly, deciphering, header decompression, control signal processing to recover IP packets from the UE 310. IP packets from the processing systems 356 and 366 may be provided to the core network. The processing systems 356 and 366 are also responsible for error detection.

In an aspect, the UE 310 may include a dual connectivity power manager 324. The dual connectivity power manager 324 may be a hardware circuit that is part of or coupled to the processing system 316 that, when executed, causes the UE 310 to perform the functionality described herein. Alternatively, the dual connectivity power manager 324 may be a memory module stored in the memory component 318 that, when executed by the processing system 316, causes the UE 310 to perform the functionality described herein.

For convenience, the apparatuses 310, 350, and/or 360 are shown in FIG. 3 as including various components that may be configured according to the various examples described herein. It will be appreciated, however, that the illustrated blocks may have different functionality in different designs.

The various components of the apparatuses 310, 350, and 360 may communicate with each other over data buses. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 312 to 324 may be implemented by processor and memory component(s) of the UE 310 (e.g., by execution of appropriate code and/or by appropriate configuration of processor components). Similarly, some or all of the functionality represented by blocks 352 to 358 may be implemented by processor and memory component(s) of the primary RAT node 350 (e.g., by execution of appropriate code and/or by appropriate configuration of processor components). Also, some or all of the functionality represented by blocks 362 to 368 may be implemented by processor and memory component(s) of the secondary RAT node 360 (e.g., by execution of appropriate code and/or by appropriate configuration of processor components). For simplicity, various operations, acts, and/or functions are described herein as being performed "by a UE," "by a base station," "by a primary/secondary RAT node," etc. However, as will be appreciated, such operations, acts, and/or functions may actually be performed by specific components or combinations of components of the UE, base station, primary/secondary RAT node, etc., such as the processing systems 316, 356, 366, the communication devices 312, 352, 362, the dual connectivity power manager 324, etc.

Under a dual connectivity configuration, there is a power class defined for each of the primary and secondary RAT nodes as well as the UE device as a whole. In addition, the network (e.g., core network 170, application server 172, location server 230, LMF 270, etc.) may configure the amount of transmit power a UE can use to transmit in total, and on each of the dual communication links (e.g., wireless links 342 and 344). For example, under an EN-DC configuration, the network may configure the maximum amount of power permitted for uplink transmissions over the LTE ($P_{LTE}$) and NR ($P_{NR}$) communication links (e.g., via RRC signaling) so that the combined transmission power on the LTE and NR communication links does not exceed the power class of the EN-DC configuration ($P_{Powerclass,\ ENDC}$) when the UE is transmitting on both links concurrently. An example of the transmission power values are $P_{LTE}=P_{NR}=20$ decibel-milliwatts (dBm), where the total EN-DC power class is 23 dBm. Note that these numbers are in the logarithmic domain, and as such, if converted to the linear domain, they would be doubled. However, for LTE standalone, the maximum transmit power may be permitted to reach 23 dBm, which is double the maximum LTE transmit power under the EN-DC configuration. For both the primary and secondary RAT nodes, their respective maximum transmission power is determined at least as the minimum of their respective power class, the network configured maximum power for the respective node (if present), as well as the maximum power for the dual connectivity (or equivalently the UE device) as a whole. The maximum power of the dual connectivity is determined as the minimum of the power class defined for the dual connectivity and any network configured maximum power for this dual connectivity (if present).

A time-division multiplexing (TDM) scheme has been defined for EN-DC. In TDM operation, the network configures a reference subframe pattern that forces the UE's LTE and NR components to transmit in different time periods (e.g., subframes) so that the maximum transmission power for EN-DC will not be exceeded at any given time instance.

A dynamic power sharing (DPS) scheme has also been defined for EN-DC. This scheme is applicable when the maximum transmission power of LTE plus NR transmissions exceeds the total allowed maximum power for EN-DC and the NR link is established in FR1 (the same as the LTE link would be. In every slot (e.g., 0.5 milliseconds in FR1), the communication device transmitting over the NR link (or the communication controller or processing system, referred to as the "NR side") determines the power level of the uplink LTE transmission in that slot and then utilizes the remaining amount of power for NR transmission. Specifically, the NR side subtracts the amount of power used for LTE transmissions from the total EN-DC power to determine the transmit power allowed for NR transmission. This calculation is performed for every uplink slot in which data is transmitted over the NR link.

However, for various reasons, not every UE is capable of DPS. For example, the chipset architecture of the UE may prevent LTE and NR interactions or inter-communications in every slot (e.g., if there is a sufficiently large latency in sending the power information for the LTE link to the NR side). As another example, the UE may not have sufficient processing power to calculate the amount of power permitted for NR transmission (this dynamic computation can cost more processing). As will be appreciated, these are only examples, and there may be other reasons that a UE is not capable of DPS.

One possible solution is to have the network configure the maximum power for both LTE ($P_{LTE}$) and NR ($P_{NR}$) transmissions so that the summation is no larger than the total allowed power for EN-DC. This is referred to as a "network power split." However, this network configuration is optional, meaning it may not always be present. In addition, the network can misconfigure these parameters so that the summation of the two exceeds the total allowed power for EN-DC. In this case, the UE may be forced into a radio link failure (RLF) to indicate the problem to the network (so that it can be fixed), if no better alternative is available. Such a network misconfiguration can be an issue in NR deployments.

As such, there is a problem of how to effectively manage power allocation between LTE and NR transmissions, or in general any MR-DC scenario, for a non-DPS-capable UE. This is especially the case where the network configuration may or may not be available and/or correct while transmit power coordination is necessary due to a total power constraint (e.g., the power class of EN-DC ($P_{Powerclass,EN-DC}$), or $P_{EN-DC}$, that is configured by the network as the maximum transmission power for the UE device, or the minimum of the two).

Accordingly, as a first solution, the present disclosure provides a "pseudo DPS" algorithm. Similar to DPS, in this algorithm, uplink NR transmissions use any power "left over," or remaining, after LTE transmission, but looks at a longer time dimension in order to meet the total power constraint on average (not necessarily instantaneously every slot). It may also be enabled or disabled by, for example, a feature flag, a parameter configurable by the end user, or based on the location of the UE (e.g., public land mobile network (PLMN), mobile country code (MCC), etc.).

In greater detail, this algorithm is a lookup table (LUT) based solution for MR-DC power management. With this solution, the UE's instantaneous total transmission power for both LTE and NR transmissions may exceed the power class of EN-DC, but the averaged transmission power should not. Table 1 is an example LUT having five rows, and therefore five ranges.

TABLE 1

| | Maximum Tx Power (dBm) per RAT | |
|---|---|---|
| LTE's Reported Tx Power (dBm) | Tx0 (LTE) | Tx1 (NR) |
| Tx0 ≤ P1 = min{$P_L$, $P_E$-y1} | $P_L$ | y1 = $P_N$-$b_0$ |
| $P_1$ < Tx0 ≤ $P_2$ = min{$P_L$, $P_E$-y2} | $P_L$ | y2 = y1-$b_1$ |
| $P_2$ < Tx0 ≤ $P_3$ = min{$P_L$, $P_E$-y3} | $P_L$ | y3 = y2-$b_2$ |
| $P_3$ < Tx0 ≤ $P_4$ = min{$P_L$, $P_E$-y4} | $P_L$ | y4 = y3-$b_3$ |
| $P_4$ < Tx0 ≤ $P_5$ = min{$P_L$, $P_E$-y5} | $P_L$ | y5 = y4-$b_4$ |

In the table above, the subtraction in the first column (LTE's reported transmission power) is firstly performed in the linear domain (milliwatts (mW)) and then converted to dBm. As shown in Table 1, the upper bound of each row/range is $P_i$, which is the minimum of $P_L$ and $P_E$-$y_i$, where i=1, 2, 3, 4, 5. $P_E$ is the minimum of $P_{Powerclass,EN-DC\_NEW}$ and $P_{EN-DC}$, and $y_i$ is the maximum power for NR (indicated in the "Tx1(NR)" column of Table 1). $P_{Powerclass,EN-DC\_NEW}$ is equal to the power class of EN-DC ($P_{Powerclass,EN-DC}$) if the p-ENDC-NV value is not set, and to p-ENDC-NV if the p-ENDC-NV value is set. The p-ENDC-NV value may be configured as the maximum power for EN-DC and can be accessed and written by the original equipment manufacturer (OEM). The p-ENDC-NV value may be larger or smaller than the nominal power class of $P_{Powerclass,EN-DC}$. However, it should be within the tolerance range defined by the applicable specification. For example, if the tolerance is +2 to −3 dBm and $P_{Powerclass,EN-DC}$ is 23 dBm, then p-ENDC-NV should be within the range of, for example, 20 to 25 dBm.

The Tx0 (LTE) column represents the maximum transmission power that LTE can use before its next transmission power report, which is equal to $P_L$. $P_L$ is the minimum of $P_{Powerclass,LTE\_NEW}$, $P_{LTE}$, and $P_E$. $P_{Powerclass,LTE\_NEW}$ is equal to the power class of LTE ($P_{Powerclass,LTE}$) if the p-LTE-NV value is not set, and to p-LTE-NV if the p-LTE-NV value is set. The p-LTE-NV value is configured as the maximum power for LTE and may be accessed and written by the OEM. The p-LTE-NV value may be larger or smaller than the nominal power class of $P_{Powerclass,LTE}$. However, it should be within the tolerance range defined by the applicable specification.

The Tx1 (NR) column represents the maximum transmission power that NR can use before LTE's next transmission power report, and is derived based on the ratios of {$b_0$, $b_1$, $b_2$, $b_3$, $b_4$}, which may be configured by the OEM. As shown in Table 1, in the first row/range, y1=$P_N$-$b_0$, where $P_N$ is the minimum of $P_{Powerclass,NR\_NEW}$, $P_{NR}$, and $P_E$, and $y_k$=$y_{k-1}$-$b_{k-1}$, where k=2, 3, 4, 5. $P_{Powerclass,NR\_NEW}$ is equal to the power class of NR ($P_{Powerclass,NR}$) if the p-NR-NV value is not set, and to the p-NR-NV value if the p-NR-NV value is set. The p-NR-NV value is configured as the maximum power for NR and may be accessed and written by the OEM. The p-NR-NV value may be larger or smaller than the nominal power class of $P_{Powerclass,NR}$. However, it should be within the tolerance range defined by the applicable specification.

The parameters $b_0$, $b_1$, $b_2$, $b_3$, and $b_4$ may be configurable parameters/ratios. For example, $b_i$ may be greater than or equal to 0, where i=0, 1, 2, 3, 4. Their values may be in dB. The following is an example rule of configuration: $b_0<b_1<b_2<b_3<b_4$. The first two to three ranges (e.g., rows of the LUT) may be close to each other with identical spacing. That is, $b_1$ may be configured to be equal to $b_2$ and both may be configured to be small. This way, the indicated maximum NR power will have finer resolution (and thus smaller step size) at the higher-power range(s) while coarser resolution (and thus larger step size) at the lower-power range(s). This is to maximally utilize NR's power, given that user data is more likely to be transmitted on NR. Alternatively, the ratios can be configured in a reversed order, or in any way that is deemed reasonable.

In an aspect, the number of rows in the LUT (five in the example of Table 1) may be expanded for finer granularity in the ranges, or reduced for coarser granularity. The number of rows may also be reduced by collapsing rows with close ranges of values (based on configuration). For example, if two rows have maximum NR power values less than 0.5 dB in difference (or any gap considered reasonable), then these two rows may be collapsed into one.

There are various design principles for a LUT. For example, LTE may take priority, and its maximum transmission power may not be impacted by/derived from NR's power usage. In that case, NR transmissions would take "left-over" power from LTE. As another principle, when applying the LUT, the maximum power for NR may be determined periodically, where the periodicity is how often the LTE side (the communication device, communication controller, and/or processing system responsible for transmitting on the LTE link) reports its average power, and may be configurable. As another principle, there may be separate tables per MCC per power class triplet $\{P_{Powerclass,LTE}, P_{Powerclass,NR}, P_{Powerclass,EN-DC}\}$. However, the MCCs and/or power class triplets that share the same configuration of ratios $\{b_0, b_1, b_2, b_3, b_4\}$ may be collapsed together. Another principle is that OEMs may configure the delta values (in dB) $\{b_0, b_1, b_2, b_3, b_4\}$ indicated in the LUT. Alternatively, similar ratios may be applied towards the first column (that configures the range on LTE's reported transmission power). As yet another principle, the highest/upper bound on the range of LTE's transmission power, and both LTE and NR's maximum power, may depend not only on the power class, but also on the network configured/signaled maximum power for LTE and EN-DC. This may be provided in system information or dedicated signaling. As another principle, when the LTE side's reported transmission power exceeds the ranges that the LUT provides (i.e., higher than $P_5$ in the example of Table 1), NR transmission may be effectively turned off (e.g., its maximum transmission power is set to an arbitrarily low value).

The following is a specific example in which $P_{Powerclass,LTE}=23$ dBm, $P_{Powerclass,NR}=23$ dBm, $P_{Powerclass,EN-DC}=23$ dBm, $P_E=P_L=23$ dBm, $b_0=0.1$, $b_1=1$, $b_2=1$, $b_3=4$, and $b_4=10$. The corresponding LUT is shown below as Table 2.

TABLE 2

| LTE's Reported Tx Power(dBm) | Maximum Tx Power (dBm) per RAT | |
|---|---|---|
| | Tx0 (LTE) | Tx1 (NR) |
| Tx0 ≤ 6.6 | 23 | y1 = 22.9 |
| 6.6 < Tx0 ≤ 16.5 | 23 | y2 = 21.9 |
| 16.5 < Tx0 ≤ 18.8 | 23 | y3 = 20.9 |
| 18.8 < Tx0 ≤ 21.8 | 23 | y4 = 16.9 |
| 21.8 < Tx0 ≤ 22.9 | 23 | y5 = 6.9 |

In the example of Table 2, $b_0$ has taken a small positive value (fraction) close to 0. Ideally, if $b_0$ were 0 it would allow the NR transmission power to take the maximum possible value. However, this may lead to the upper bound of the LTE side's first power range (e.g., the first row of Table 2) to be negative infinity (i.e., 0 mW=$-\infty$ dBm), for example when $P_L=P_N=P_E$, and therefore makes the range useless.

The following is another specific example, in which $P_{Powerclass,LTE}=26$ dBm, $P_{Powerclass,NR}=23$ dBm, $P_{Powerclass,EN-DC}=26$ dBm, $P_E=P_L=26$ dBm, $b_0=0$, $b_1=1$, $b_2=1$, $b_3=3$, and $b_4=10$. The corresponding LUT is shown below as Table 3.

TABLE 3

| LTE's Reported Tx Power(dBm) | Maximum Tx Power (dBm) per RAT | |
|---|---|---|
| | Tx0 (LTE) | Tx1 (NR) |
| Tx0 ≤ 23 | 26 | y1 = 23 |
| 23 < Tx0 ≤ 23.8 | 26 | y2 = 22 |
| 23.8 < Tx0 ≤ 24.3 | 26 | y3 = 21 |
| 24.3 < Tx0 ≤ 25.3 | 26 | y4 = 18 |
| 25.3 < Tx0 ≤ 25.9 | 26 | y5 = 8 |

In this case, the ranges of reported LTE transmission power are closer to each other, as the EN-DC maximum power ($P_E$) is now 26 dBm. In an aspect, OEMs may choose to combine certain ranges when the separation is considered to be too small (e.g., less than 0.5 dB).

The present disclosure also proposes a "local power split" algorithm, in addition to the pseudo DPS algorithm described above. This algorithm may be viewed as a simplified version of the pseudo DPS algorithm. The local power split algorithm may be used when the network power split is not present or present but not correct, the pseudo DPS algorithm is not enabled (e.g., based on the enable/disable conditions described above), and the LTE side plus the NR side's maximum transmission power exceeds the total allowed maximum transmission power for EN-DC. This algorithm may be enabled or disabled by a feature flag, by the customer, based on the location of the UE (e.g., PLMN, MCC, etc.), based on testing needs (e.g., enabled during interoperability and development testing (IODT) but disabled after official commercialization), and the like. Note that here, the "location" can be a "compliment" set to those PLMN/MCCs where the pseudo DPS algorithm and/or the network split may have been applied and proved to be useful.

The following table illustrates an example structure and the UE actions for an "equal local power split" scenario.

TABLE 4

| Case Index | $P_{LTE}$ Signaled? | $P_{NR}$ signaled? | UE Action |
|---|---|---|---|
| 1 | Yes (and $P_{LTE} < P_E$) | No | Derive $P_{NR\_calculated} = P_E - P_L$ |
| 2 | No | Yes (and $P_{NR} < P_E$) | Derive $P_{LTE\_calculated} = P_E - P_N$ |
| 3 | No | No | Set up $P_{LTE\_default} = P_{NR\_default} = \frac{1}{2} P_E$ |
| 4 | Yes (and $P_{LTE} \geq P_E$) | No | Set up $P_{LTE\_default} = P_{NR\_default} = \frac{1}{2} P_E$. (No RLF in this case) |
| 5 | No | Yes (and $P_{NR} \geq P_E$) | Set up $P_{LTE\_default} = P_{NR\_default} = \frac{1}{2} P_E$ (No RLF in this case) |
| 6 | Yes | Yes | Set up $P_{LTE\_default} = P_{NR\_default} = \frac{1}{2} P_E$ (No RLF in this case) |

Figure 4:
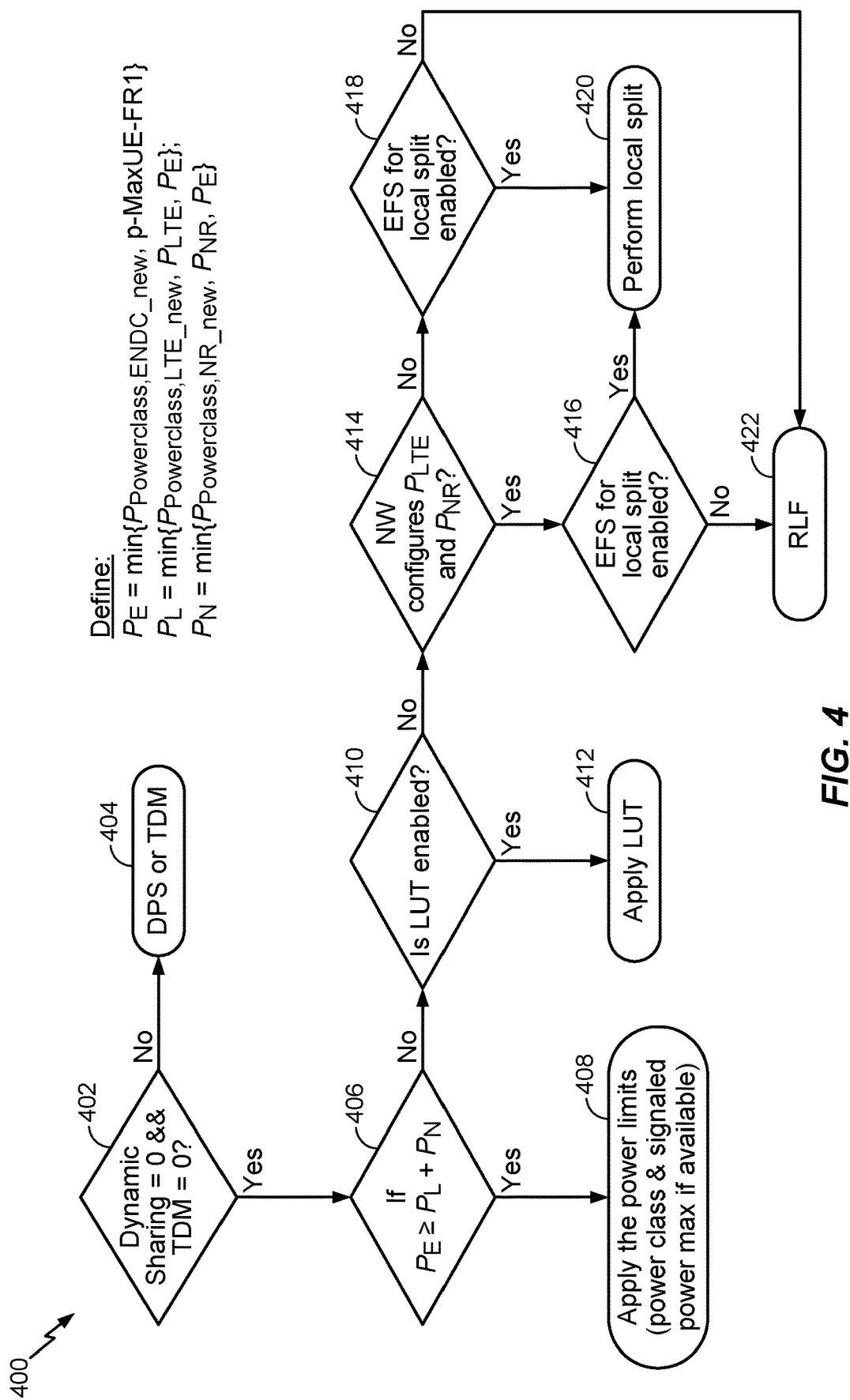
FIGS. 4 and 5 illustrate exemplary methods, according to aspects of the disclosure.

FIG. 4 is an exemplary method 400, according to various aspects of the disclosure. The method 400 may be performed by a UE, such as any of the UEs described herein, when determining how to share transmission power between LTE and NR transmissions.

At 402, the UE determines whether or not it supports DPS or TDM, or if either are currently enabled. If either is supported and enabled, then at 404, the UE uses either DPS or TDM (whichever is supported/enabled) to share uplink transmission power between LTE and NR transmissions. However, if neither is supported, that is, if DPS=0 and TDM=0 ("0" means not supported as a UE capability), then at 406, the UE determines whether $P_E$ is greater than or equal to $P_L$ plus $P_N$ (i.e., $P_E \geq P_L P_N$) in the current time period (e.g., slot, subframe, etc.). As noted above, $P_E$ is the minimum of $P_{Powerclass,EN-DC\_new}$ and $P_{EN-DC}$, $P_L$ is the minimum of $P_{Powerclass,LTE\_new}$, $P_{LTE}$, and $P_E$, and $P_N$ is the minimum of $P_{Powerclass,NR\_new}$, $P_{NR}$, and $P_E$.

If $P_E$ is greater than or equal to $P_L$ plus $P_N$, then at 408, the UE applies the configured power limits (i.e., the power class and signaled power maximum, if available). If, however, $P_E$ is less than $P_L$ plus $P_N$ (i.e., $P_E \leq P_L P_N$), then at 410, the UE determines whether or not pseudo DPS is enabled. That is, the UE determines whether or not it has been configured with an LUT for power management. If the UE has been configured with a LUT, then at 412, the UE applies the LUT to determine how to share power between LTE and NR transmissions (see, e.g., Tables 1, 2, and 3).

If the UE has not been configured with an LUT, then at 414, the UE determines whether or not the network (e.g., location server 230, LMF 270) has configured the power levels for LTE and NR (i.e., $P_{LTE}$ and $P_{NR}$). If it has, then at 416, the UE determines whether or not the local split algorithm has been enabled. If it has been enabled, then at 420, the UE performs power sharing among LTE and NR according to the power split algorithm. If it has not, then at 422, the UE declares a radio link failure (RLF).

If, at 414, the network has not configured the UE with power levels for LTE and NR, then at 418, the UE determines whether or not the local split algorithm has been enabled. If it has been enabled, then at 420, the UE performs power sharing among LTE and NR according to the power split algorithm. If it has not, then at 422, the UE declares an RLF.

The present disclosure provides additional algorithms that can be used for power management between LTE and NR (or any other two competing RATs). One is a priority-based local power split. For example, if the EN-DC power class is 23 dBm, the LTE power class is 23 dBm, and the NR power class is 23 dBm, then the UE can set one of LTE and NR as the primary RAT and allocate some large percentage (e.g., 90%) of the total permitted transmission power to this primary RAT and the remaining to the other RAT. The percentage may be a configurable parameter. The priority can be set based on, but not limited to, the following rules: (1) the RAT that can carry voice service (QoS class identifier=1), (2) the RAT that can carry signaling (e.g., LTE in the EN-DC architecture), (3) the RAT that can carry high-priority data (e.g., high-throughput, low-latency), and (4) the RAT whose cell typically has a larger footprint and thus better coverage (LTE may be better than NR in this case, and NR FR1 cells may be better than NR FR2 cells). Note that the split can be generalized to per transmitter of the UE, instead of per RAT.

Another algorithm for power management is a local power split with proportional power reduction algorithm. In this algorithm, if the network signals a maximum power for LTE and NR respectively, denoted as $P_{LTE,max}$ and $P_{NR,max}$, and $P_{LTE,max}$ plus $P_{NR,max}$ is greater than $P_E$ (i.e., $P_{LTE,max} + P_{NR,max} > P_E$), where $P_E$ is the total transmission power limit for the UE, then the UE may declare an RLF, as this is not a correct configuration (it is treated as a reconfiguration failure). An RLF may repeatedly occur in this scenario, depending on how soon the network realizes the issue and re-signals the proper power values, and therefore, can impact user experience. To avoid/reduce such RLF occurrences, the UE can reduce $P_{LTE}$ and $P_{NR}$ locally and proportionally to the network configured values so that the local $P_{LTE}$ plus the local $P_{NR}$ is less than or equal to $P_E$ (i.e., $P_{LTE\_local} P_{NR\_local} \leq P_E$). For example, if the network configures $P_{LTE,max}=23$ dBm (i.e., 200 mW) and $P_{NR,max}=20$ dBm (i.e., 100 mW) while $P_E=23$ dBm (i.e., 200 mW), the UE can apply this algorithm to proportionally reduce the LTE side and the NR side's maximum transmission power to $P_{LTE,max\_reduced}=21.25$ dBm (i.e., 133.3 mW) and $P_{NR,max\_reduced}=18.24$ dBm (i.e., 66.7 mW), respectively, so that the summation of the two equals a $P_E$ of 23 dBm.

Yet another algorithm that may be implemented for power sharing between two competing RATs is a performance-driven power sharing algorithm. In this algorithm, if the network signals a minimum transmission power (or the UE has a local "floor" or "minimum" transmission power) for, for example, two possibly concurrent RATs (such as LTE and NR, denoted as $P_{LTE,min}$ and $P_{NR,min}$), and $P_{LTE,min}$ plus $P_{NR,min}$ is less than $P_E$ (i.e., $P_{LTE,min} P_{NR,min} < P_E$), where $P_E$ is the total power limit, then the UE needs to decide which RAT gets the remaining power for better performance/coverage. One example solution could be to assign the remaining power $P_{remaining}$, which equals $P_E$ minus the sum of $P_{LTE,min}$ and $P_{NR,min}$ (i.e., $P_{remaining}=P_E-(P_{LTE,min}+P_{NR,min})$), to (1) any of the RATs, if no priority is set (i.e., equal priority), or to (2) the RAT with highest priority, where the priority may be determined based on those listed in the discussion above of the priority-based local power split algorithm.

For instance, $P_{remaining}$ may initially be allocated to NR based on the first solution above (i.e., no priority is set). Afterwards, the UE monitors the signaling failure rate on LTE, and if N_failure number of consecutive failures have been observed on LTE, then the UE can assign $P_{remaining}$ to LTE. The parameter N_failure may be configurable. A failure may be determined based on, but not limited to, whether the number of retransmissions has reached more than half of the RLC maximum number of retransmissions, where the threshold of "half" may also be configurable. In an aspect, a timer may be started afterwards to ensure the allocation is not reverted quickly back to NR. Alternatively, the UE may monitor the LTE side's signaling success rate and give P$_{remaining}$ back to NR if the success rate is greater than or equal to a configurable Percentage_Signaling_success_rate threshold.

Instead of the foregoing options regarding how to determine which RAT gets the remaining transmission power, the UE can instead increase the power locally and proportionally to the network configured values (of P$_{LTE,min}$ and P$_{NR,min}$) so that the local P$_{LTE}$ plus the local P$_{NR}$ is equal to P$_E$. In this case, the UE may not further increase either side's power. For example, if P$_{LTE,min}$=11 dBm (i.e., 12.5 mW P$_{NR,min}$=17 dBm (i.e., 50 mW) and P$_E$=23 dBm (200 mW), then UE may increase the LTE side and the NR side's transmission power proportionally up to 16 dBm (40 mW) for LTE and 22 dBm (160 mW) for NR, respectively, while maintaining their summation at a P$_E$ of 23 dBm.

Another algorithm for power management disclosed herein is a time-average-based power adjustment algorithm. For instance, the LTE and NR sides may not be able to quickly communicate between themselves, such as on a subframe/slot basis, and therefore, may not be able to perform subframe/slot level power sharing. As such, if, for example, the power class falls under "P$_{Powerclass,EN-DC}$=23 dBm, P$_{Powerclass,LTE}$=23 dBm, P$_{Powerclass,NR}$=23 dBm," the UE may have to locally reduce LTE power to 20 dBm, for example, which can result in LTE being power limited, which can impact performance and user experience (e.g., a voice over LTE (VoLTE) call drop). Accordingly, the time-average-based power adjustment algorithm allows the UE to adjust the NR side's maximum power at a slower pace (e.g., slower than every subframe/slot). In this way, LTE and NR transmissions may stay at or within the maximum power of 23 dBm at all times.

In the time-average-based power adjustment algorithm, the LTE and NR sides periodically report their respective transmission power. The periodicities may be different for LTE and NR, and both may be configurable. At each reporting instance (denoted by index n below), the UE calculates the following:

$$P_{EN-DC}(n) = P_{LTE}(n) + P_{NR}(n) \quad 1)$$

$$e(n) = P_{Powerclass,EN-DC} - P_{EN-DC}(n) \quad 2)$$

$$P_{NR,Max}(n+1) = \min\{P_{Powerclass,NR}, P_{NR,Max}(n) + e(n)\} \quad 3)$$

where P$_{LTE}$(n) is the reported LTE transmission power at instance n, P$_{NR}$(n) is the reported NR transmission power at instance n, P$_{EN-DC}$(n) is the total reported EN-DC power, e(n) is the "balance" from the EN-DC power class, and P$_{NR,Max}$(n) is the adjusted maximum NR transmission power for the next reporting period.

For the above calculations, if, at the reporting instance n, only one RAT reports its transmission power, then the UE assumes the same value from the previous report for the other RAT, if any, or 0 otherwise (which may also be the initial condition). For instance, the NR side may report every 100 ms but the LTE side may report every 200 ms. As such, the UE will only have a value for LTE every other time it has a value for NR.

Before the next transmission power reporting instance (n+1), the NR side applies P$_{NR,Max}$(n+1) to determine the maximum allowed transmission power, which may also be impacted by the specific absorption rate (SAR) and/or maximum permissible exposure (MPE) backoff, emission, etc. The equivalent logic can apply to the LTE side.

Another algorithm for power management disclosed herein is a time-average-based power adjustment algorithm with prediction. This algorithm intends to set the maximum configurable power for NR for the next T ms based on both NR and LTE's average power in the past. The rationale is to take into account the future transmissions and assume those are always at maximum power (P$_{LTE}$ and P$_{NR}$).

First, the UE calculates the parameter P$_{Avg\_LTE\_w\_future}$. For every uplink subframe (or slot) over the power averaging period T_avg_period, the UE uses the actual transmission power if there is a transmission, or uses "0" if there is no transmission. For the future, the UE counts only one instance of P$_{LTE}$. Second, the UE calculates P$_{Avg\_NR}$. For every uplink symbol over T_avg_period, the UE uses the actual transmission power if there is a transmission, or uses "0" if there is no transmission. Third, the UE derives P$_{MAX\_NR}$ according to:

$$\frac{P_{MAX\_NR} + \sum_{i=1}^{N_{NR}} P_{NR}(i)}{N_{NR} + 1} = P_{Powerclass,EN-DC} - P_{Avg\_LTE\_w\_future},$$

where P$_{Avg\_LTE\_w\_future}$ is the average LTE power over T_avg_period while accounting for the future assuming P$_{LTE}$, P$_{Avg\_NR}$ is the average NR power over T_avg_period, P$_{MAX\_NR}$ is the maximum NR transmission power for T_future, T_future is the maximum power applicable period, P$_{NR}$(i) is the instantaneous transmission power in uplink slot i, and N$_{NR}$ is the number of NR uplink symbols over T_avg_period. As will be appreciated, equivalent logic can be applied to LTE (i.e., the LTE side receives the remainder from the NR side, e.g., as in NE-DC).

As will be appreciated, although the foregoing techniques have generally been described in terms of EN-DC, LTE, and NR, the disclosed techniques are applicable to any type of dual connectivity that falls under the umbrella of MR-DC, such as NR-DC, NGEN-DC, NE-DC, and the like.

Figure 5:
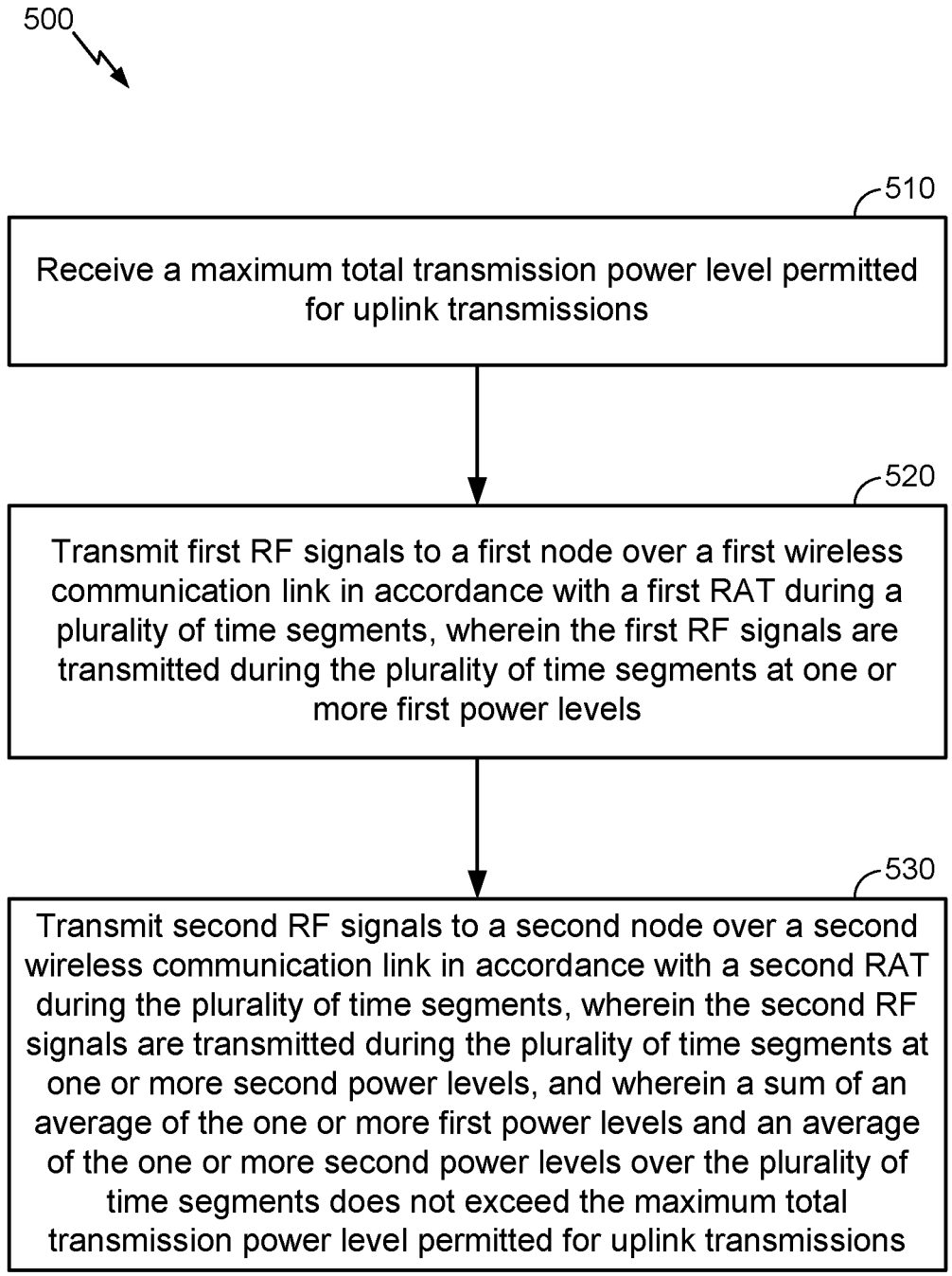

FIG. 5 illustrates an exemplary method 500 of wireless communication, according to aspects of the disclosure. The method 500 may be performed by a UE (e.g., any of the UEs described herein).

At 510, the UE receives a maximum transmission power level permitted for uplink transmissions. In an aspect, operation 510 may be performed by communication device 312, communication controller 314, processing system 316, memory component 318, and/or dual connectivity power manager 324, any or all of which may be considered means for performing this operation.

At 520, the UE transmits first RF signals to a first node over a first wireless communication link in accordance with a first RAT (e.g., LTE) during a plurality of time segments, wherein the first RF signals are transmitted during the plurality of time segments at one or more first power levels. In an aspect, operation 520 may be performed by transceiver 320, communication controller 314, processing system 316, memory component 318, and/or dual connectivity power manager 324, any or all of which may be considered means for performing this operation.

At 530, the UE transmits second RF signals to a second node over a second wireless communication link in accordance with a second RAT during the plurality of time segments, wherein the second RF signals are transmitted during the plurality of time segments at one or more second power levels. In an aspect, a sum of an average of the one or more first power levels and an average of the one or more second power levels over the plurality of time segments does not exceed the maximum total transmission power level permitted for uplink transmissions. In an aspect, operation 520 may be performed by transceiver 322, communication controller 314, processing system 316, memory component 318, and/or dual connectivity power manager 324, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    receiving a maximum total transmission power level permitted for uplink transmissions;
    transmitting first radio frequency (RF) signals to a first node over a first wireless communication link in accordance with a first radio access technology (RAT) during a plurality of time segments, wherein the first RF signals are transmitted during the plurality of time segments at one or more first power levels; and
    transmitting second RF signals to a second node over a second wireless communication link in accordance with a second RAT during the plurality of time segments, wherein the second RF signals are transmitted during the plurality of time segments at one or more second power levels, and
    wherein a sum of an average of the one or more first power levels and an average of the one or more second power levels over the plurality of time segments does not exceed the maximum total transmission power level permitted for uplink transmissions.

2. The method of claim 1, further comprising:
    determining each of the one or more first power levels based on the maximum total transmission power level.

3. The method of claim 2, further comprising:
    determining the one or more second power levels based, at least in part, on the one or more first power levels and the maximum total transmission power level.

4. The method of claim 3, wherein the determining comprises:
determining, in each of the plurality of time segments, a remaining amount of transmission power for the second RAT after determining an amount of transmission power for the first RAT, wherein each of the one or more second power levels comprises the remaining amount of transmission power.

5. The method of claim 3, wherein the determining comprises:
accessing a power management lookup table, the power management lookup table comprising a plurality of ranges of power levels for the first RAT for the maximum total transmission power level, each of the plurality of ranges of power levels for the first RAT having a corresponding power level for the second RAT;
identifying, from the power management lookup table for each of the one or more first power levels, a range of the plurality of ranges of power levels to which the first power level belongs; and
identifying each of the one or more second power levels as the power level corresponding to the identified ranges to which each of the one or more first power levels belongs.

6. The method of claim 1, further comprising:
reporting a power level of the first RAT at an end of each of the plurality of time segments.

7. The method of claim 6, wherein a power level at which the second RF signals are transmitted during a subsequent time segment of the plurality of time segments is based on a power level at which the first RF signals were transmitted during a previous time segment of the plurality of time segments.

8. The method of claim 1, further comprising:
determining whether or not a maximum transmission power level for the first RAT and/or a maximum transmission power level for the second RAT has been received, wherein the maximum transmission power level for the first RAT and the maximum transmission power level for the second RAT are configured based on the maximum total transmission power level.

9. The method of claim 8, further comprising:
determining whether or not the UE is configured to split transmission power between the first RAT and the second RAT.

10. The method of claim 9, further comprising:
based on the UE not having received, or having received incorrect values of, the maximum transmission power level for the first RAT and/or the maximum transmission power level for the second RAT and the UE not being configured to split transmission power between the first RAT and the second RAT, declaring a radio link failure.

11. The method of claim 8, further comprising:
based on the UE having received the maximum transmission power level for the first RAT and the maximum transmission power level for the second RAT, determining whether or not a sum of the maximum transmission power level for the first RAT and the maximum transmission power level for the second RAT is greater than the maximum total transmission power level.

12. The method of claim 11, further comprising:
based on the sum of the maximum transmission power level for the first RAT and the maximum transmission power level for the second RAT being greater than the maximum total transmission power level, reducing one or both of the maximum transmission power level for the first RAT and the maximum transmission power level for the second RAT.

13. The method of claim 1, further comprising:
allocating more transmission power to the first RAT than the second RAT based on the first RAT having a higher priority than the second RAT.

14. The method of claim 13, wherein the first RAT has a higher priority than the second RAT based on the first RAT carrying voice service, the first RAT carrying control signaling, the first RAT carrying high-priority data, the first RAT having a larger coverage area than the second RAT, or any combination thereof.

15. The method of claim 1, further comprising:
receiving a minimum power level for the first RAT and a minimum power level for the second RAT.

16. The method of claim 15, further comprising:
assigning remaining transmission power to a higher priority RAT of the first RAT and the second RAT.

17. The method of claim 1, wherein each of the plurality of time segments comprises a slot or a subframe.

18. The method of claim 1, wherein:
the first node comprises a master node,
the first wireless communication link comprises an anchor wireless communication link,
the second node comprises a secondary node, and
the second wireless communication link comprises a secondary wireless communication link.

19. The method of claim 1, wherein the first RAT comprises Long-Term Evolution (LTE) and the second RAT comprises New Radio (NR).

20. An apparatus for wireless communication, comprising:
a memory of a user equipment (UE);
at least one processor of the UE coupled to the memory; and
a communication device of the UE coupled to the at least one processor, the communication device configured to:
receive a maximum total transmission power level permitted for uplink transmissions;
transmit first radio frequency (RF) signals to a first node over a first wireless communication link in accordance with a first radio access technology (RAT) during a plurality of time segments, wherein the first RF signals are transmitted during the plurality of time segments at one or more first power levels; and
transmit second RF signals to a second node over a second wireless communication link in accordance with a second RAT during the plurality of time segments, wherein the second RF signals are transmitted during the plurality of time segments at one or more second power levels, and
wherein a sum of an average of the one or more first power levels and an average of the one or more second power levels over the plurality of time segments does not exceed the maximum total transmission power level permitted for uplink transmissions.

21. The apparatus of claim 20, wherein the at least one processor is configured to:
determine each of the one or more first power levels based on the maximum total transmission power level.

22. The apparatus of claim 21, wherein the at least one processor is configured to:

determine the one or more second power levels based, at least in part, on the one or more first power levels and the maximum total transmission power level.

23. The apparatus of claim 22, wherein the at least one processor being configured to determine comprises the at least one processor being configured to:
access a power management lookup table, the power management lookup table comprising a plurality of ranges of power levels for the first RAT for the maximum total transmission power level, each of the plurality of ranges of power levels for the first RAT having a corresponding power level for the second RAT;
identify, from the power management lookup table for each of the one or more first power levels, a range of the plurality of ranges of power levels to which the first power level belongs; and
identify each of the one or more second power levels as the power level corresponding to the identified ranges to which each of the one or more first power levels belongs.

24. The apparatus of claim 20, wherein the at least one processor is configured to:
report a power level of the first RAT at an end of each of the plurality of time segments.

25. The apparatus of claim 24, wherein a power level at which the second RF signals are transmitted during a subsequent time segment of the plurality of time segments is based on a power level at which the first RF signals were transmitted during a previous time segment of the plurality of time segments.

26. The apparatus of claim 20, wherein the at least one processor is configured to:
determine whether or not a maximum transmission power level for the first RAT and/or a maximum transmission power level for the second RAT has been received, wherein the maximum transmission power level for the first RAT and the maximum transmission power level for the second RAT are configured based on the maximum total transmission power level.

27. The apparatus of claim 26, wherein the at least one processor is configured to:
determine, based on the UE having received the maximum transmission power level for the first RAT and the maximum transmission power level for the second RAT, whether or not a sum of the maximum transmission power level for the first RAT and the maximum transmission power level for the second RAT is greater than the maximum total transmission power level.

28. The apparatus of claim 27, wherein the communication device is further configured to:
reduce, based on the sum of the maximum transmission power level for the first RAT and the maximum transmission power level for the second RAT being greater than the maximum total transmission power level, one or both of the maximum transmission power level for the first RAT and the maximum transmission power level for the second RAT.

29. An apparatus for wireless communication, comprising:
means of a user equipment (UE) for receiving a maximum total transmission power level permitted for uplink transmissions;
means of the UE for transmitting first radio frequency (RF) signals to a first node over a first wireless communication link in accordance with a first radio access technology (RAT) during a plurality of time segments, wherein the first RF signals are transmitted during the plurality of time segments at one or more first power levels; and
means of the UE for transmitting second RF signals to a second node over a second wireless communication link in accordance with a second RAT during the plurality of time segments, wherein the second RF signals are transmitted during the plurality of time segments at one or more second power levels, and
wherein a sum of an average of the one or more first power levels and an average of the one or more second power levels over the plurality of time segments does not exceed the maximum total transmission power level permitted for uplink transmissions.

30. A non-transitory computer-readable medium storing computer-executable instructions that, when executed by a user equipment (UE), cause the UE to:
receive a maximum total transmission power level permitted for uplink transmissions;
transmit first radio frequency (RF) signals to a first node over a first wireless communication link in accordance with a first radio access technology (RAT) during a plurality of time segments, wherein the first RF signals are transmitted during the plurality of time segments at one or more first power levels; and
transmit second RF signals to a second node over a second wireless communication link in accordance with a second RAT during the plurality of time segments, wherein the second RF signals are transmitted during the plurality of time segments at one or more second power levels, and
wherein a sum of an average of the one or more first power levels and an average of the one or more second power levels over the plurality of time segments does not exceed the maximum total transmission power level permitted for uplink transmissions.

* * * * *